US006019281A

United States Patent [19]

Emmett et al.

[11] Patent Number: 6,019,281

[45] Date of Patent: Feb. 1, 2000

[54] POSTAL SECURITY DEVICE WITH DISPLAY

[75] Inventors: James S. Emmett, New Haven County; Andrew L. Rozum, Jr., Beacon Falls, both of Conn.

[73] Assignee: Micro General Corp., Oxford, Conn.

[21] Appl. No.: 08/995,905

[22] Filed: Dec. 22, 1997

[51] Int. Cl.[7] .......... G06F 17/00

[52] U.S. Cl. .......... 235/375; 235/376; 364/918.52; 705/403

[58] Field of Search .......... 235/375, 376, 235/381; 705/401, 403; 364/918.52, 926.2, 926.5, 927.2

[56] References Cited

U.S. PATENT DOCUMENTS

| | | | |
|---|---|---|---|
| 4,097,923 | 6/1978 | Eckert, Jr. et al. | 705/403 |
| 4,283,721 | 8/1981 | Eckert | 340/680 |
| 4,492,159 | 1/1985 | Clark | 101/71 |
| 4,876,956 | 10/1989 | Riley et al. | 101/91 |
| 5,517,011 | 5/1996 | Vandenengel | 235/441 |
| 5,541,583 | 7/1996 | Mandelbaum | 340/825.54 |
| 5,585,613 | 12/1996 | Bell et al. | 235/101 |

OTHER PUBLICATIONS

United States Postal Service, Information Based Indicia Program Postal Security Device Specification, Jun. 13, 1996.

*Primary Examiner*—Michael G Lee
*Assistant Examiner*—Drew A. Dunn
*Attorney, Agent, or Firm*—Fitzpatrick, Cella, Harper & Scinto

[57] ABSTRACT

A primary circuit has an associated parameter, and a display circuit maintains a copy of that parameter. The display circuit displays the parameter based on the copy, and updates the copy by listening in on communications between the primary circuit and an external device. In a preferred embodiment, the primary circuit is a postal security device (PSD) and the parameter is the value of the descending register of the PSD.

25 Claims, 3 Drawing Sheets

POSTAL SECURITY DEVICE WITH DISPLAY

BACKGROUND OF THE INVENTION

The present invention relates to a postal security device (PSD) for use in a postage meter. More specifically, it relates to a PSD with a display that can display the contents of certain registers within the PSD.

The United States Postal Service has proposed an Information Based Indicia Program (IBIP) to replace the indicia (postmarks) printed by traditional postage meters. IBIP will use a two-dimensional symbol printed on the envelope to provide evidence that postage was paid, as well as providing additional information fields. This information is encoded into the symbol together with security information. The two-dimensional symbols can be thought of as an advanced version of the bar codes that are commonly used to identify products in supermarkets.

In contrast to traditional postage meters, in which all the indicia with the same postage value printed on a given day are identical, the indicia printed on each piece of mail using an IBIP symbol will be different. This will create a unique and traceable identity for each piece of mail.

A PSD is a security device that is used in conjunction with a host system to create the IBIP indicia. According to Post Office specification, the host may either be 'closed' (i.e., dedicated solely to printing indicia like current postage meters) or 'open' (i.e., having other functions such as a personal computer with a connected printer). The PSD is implemented in hardware and provides a number of security functions, including cryptographic digital signature generation and verification. The PSD also maintains the descending register, which tracks the amount of postage available for postmark creation, and the ascending register, which tracks the total postage value used by a given PSD. These registers perform the same functions as the ascending and descending registers of traditional postage meters.

Postage is loaded into the PSD by a remote communications link. When this occurs, the descending register is updated by the amount loaded so as to keep track of the amount of postage available for printing indicia. As each indicium is printed, the descending register is decremented to reflect the amount of postage that remains. The amount shown in the descending register is equivalent to actual money and may be exchanged for money by surrendering the PSD.

Because the Postal Service's PSD specifications only provide for accounting and security functions, a PSD designed to meet those specifications would only provide those functions. All the other functions of the postage meter, including printing of the IBIP indicia and display of the ascending and descending registers, must be provided by the host system. While the host system could be either a dedicated postage meter or an ordinary PC with a printer, it is expected that the PSDs themselves will be the same for all host environments. As a result, the only ways to access these registers are through a host system monitor, by printed indicium, or by a device audit. To accomplish any of these, however, the PSD must first be connected to the host.

PSDs may be implemented as a cartridge that can be inserted into and removed from the host system. This implementation is advantageous because it allows the PSD to be removed and locked in a secure place when not in use and allows the PSD to be used with multiple hosts. In addition, in the event of a host failure, the PSD may be transferred to another host to enable repair of the failed host system without tying up the postage contained in the PSD.

It also simplifies meeting some of the PSD requirements, such as rugged enclosures and the use of physically distinct connectors for the data port and the authentication port. Of particular note is a requirement for the PSD enclosure to detect any tampering at the time the tampering occurs and to immediately erase all memory contents that are cryptographically important (but not the descending and ascending registers). This almost certainly implies using long lived battery-powered detection and erasing circuits, including a 'self destruct' mode for when battery failure is near.

The PSD specifications do not require any display functions to be provided within the PSD itself. This causes a number of disadvantages. In particular, because the contents of the registers in the PSD can only be accessed when the PSD is connected to a host, a user cannot determine the contents of the PSD registers when the PSD is removed from the host. As a result, the only way to determine the contents of a register of an uninstalled PSD is to reinsert the PSD into a host, and use the host's facilities to display the desired information. This can be problematic because a host may not be available.

The inability to check PSD registers without installing the PSD into a host could also cause problems in environments where multiple PSDs are used (e.g., a contract mailing service company) and one of the PSDs is to be selected for insertion into a host. In this situation, it would be relatively easy to confuse a depleted PSD with a full one. This could cause significant inconvenience if a depleted PSD is inserted into a mailing machine with the expectation that it is full. Accordingly, the ability to read the PSD registers without inserting the PSD into a base would be a great convenience.

Until now, however, displays for PSDs have never been implemented. Moreover, rigorous cryptographic security requirements imposed by the Post Office make the connection of a display or other peripheral to the PSD a serous design challenge. Previous, non-PSD based postal meters have included display features that allow a user to determine the amount of postage remaining in the meters. U.S. Pat. No. 4,876,956 to Riley is an example of this type of postal meter. But because these postage meters are not PSD-based, they do not provide guidance on incorporating a display feature into a PSD.

SUMMARY OF THE INVENTION

Accordingly, it is an object of the present invention to incorporate a display with a PSD to enable a user to view the contents of selected internal registers of the PSD without first installing the PSD into a base unit Another object of the present invention is to enable a user to view the internal registers of the PSD without physically connecting to the registers inside the PSD.

In accordance with an aspect of the present invention, a primary circuit (e.g., a PSD) has an associated parameter (e.g., a descending register value) and a display circuit maintains a copy of that parameter. The display circuit displays the parameter based on the copy, and updates the copy by listening in on communications between the primary circuit and a host.

BRIEF DESCRIPTION OF THE DRAWINGS

The above, and other objects, features, and advantages of the present invention will be apparent in the following detailed description of illustrative embodiments thereof, which is to be read in connection with the accompanying drawings, wherein.

DETAILED DESCRIPTION OF THE PREFERRED EMBODIMENTS

While the present inventors are unaware of any commercially available PSD, a block diagram of a basic PSD that meets the published Postal Service specifications can be readily envisioned. More specifically, FIG. 1 is a simple implementation of the specifications that require the data ports for unencrypted critical PSD-security parameters to be physically separated from other data ports; the PSD to contain the ascending and descending registers; and that the readings of both those registers must be visible through a host system monitor and by printed indicium.

Figure 1:
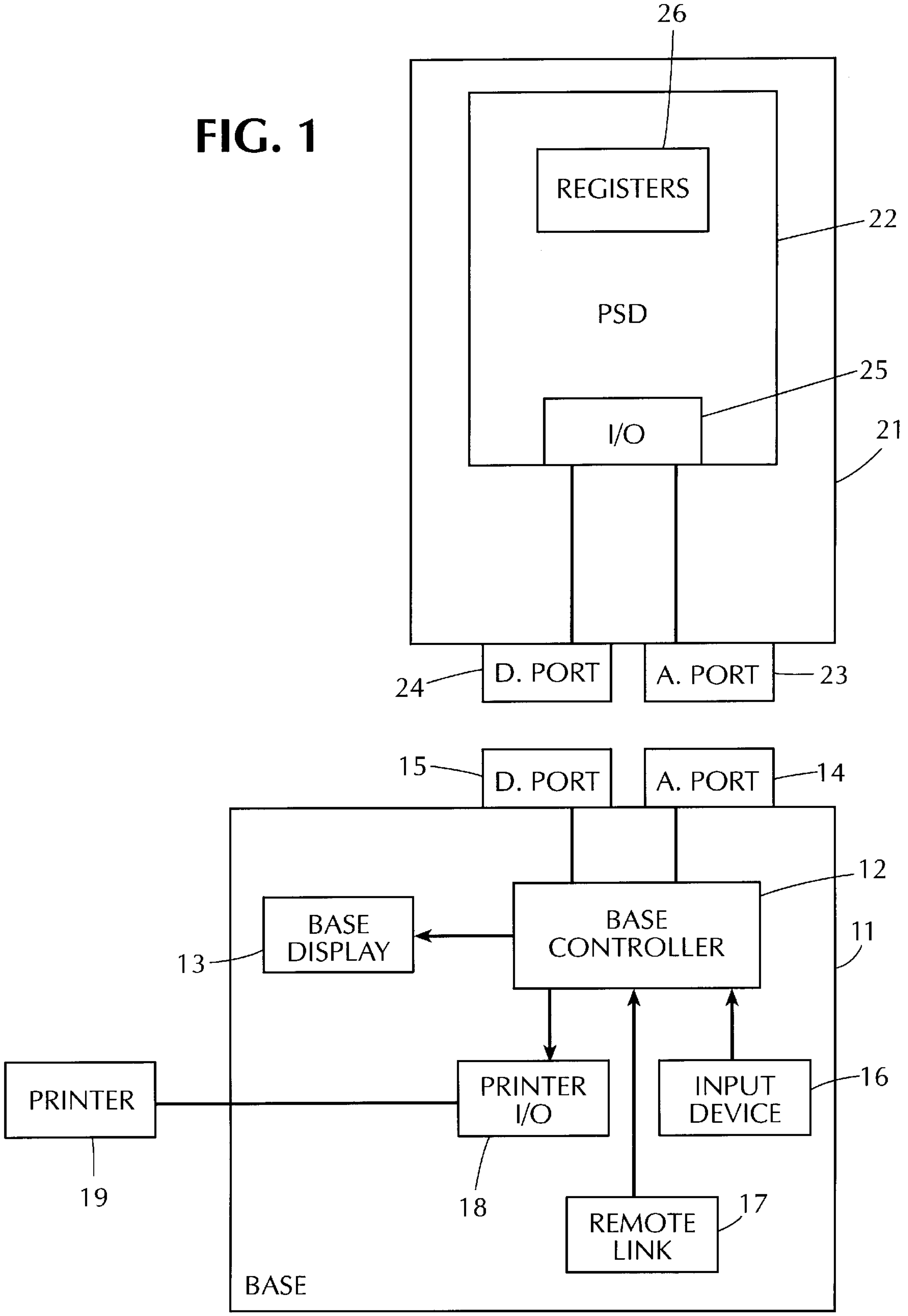
FIG. 1 is a block diagram of a hypothetical PSD that does not incorporate the present invention.

In FIG. 1, a PSD 22 is included within a PSD housing 21. Within the PSD 22 are registers 26 which, at a minimum, include the descending register (which tracks the amount of postage available for postmark creation) and the ascending register (which tracks the total postage value used by a given PSD). The PSD 22 also includes interface (I/O) circuitry 25 that interfaces with a data port 24 and an authentication port 23. As required by Postal Service specifications, the data port 24 is physically separate from the authentication port 23.

The PSD 22 communicates with a base controller 12 that is located within a base unit 11. The base unit 11 also includes a data port 15 and an authentication port 14, for connecting with the corresponding ports 24 and 23 on the PSD 22. The PSD ports 24 and 23 may plug directly into connectors on the base 11.

Alternatively, cables may be used to connect the PSD 22 to the base 11. As yet another alternative, the PSD ports 24 and 23 may communicate with the base unit 11 using a non-contact interface such as an inductive pickup connection, an infrared light or RF interface, or the like. These interfaces may be implemented in any conventional manner.

The base unit 11 also includes a base display 13 and a base input device 16. The base display 13 can be used to display various system parameters, including the values contained in the ascending and descending registers 26 of the PSD 22. The input device 16 can be any conventional input device including a pushbutton switch, keyboard, touch screen, track ball, mouse, joystick, digitizer tablet, etc.

In this system, the PSD provides the security functions and keeps track of the ascending and descending registers 26. The base unit 11 provides the user interface via the display 13 and the input device 16. The input device 16 provides inputs to the base controller 12 to select the desired function, including, for example, printing postage indicia and requesting a download of postage into the PSD.

Assuming that the descending register in the PSD has been loaded up with postage, the system may be used for printing postage indicia. To accomplish this, a user would provide a command to the base controller 12 via the input device 16. The base controller 12 receives this command from the input device 16 and then communicates with the PSD 22 via the data ports 15, 24 and authentication ports 14, 23. The PSD decrements the descending register, increments the ascending register, and authorizes the printing of indicia. This authorization is received by the base controller 12 via the ports, which will then send signals to the printer interface 18 that will control the printing of the indicia.

When the base controller is connected to the PSD, as described above, a user can also access the registers 26 in the PSD 22 to determine how much postage remains in the PSD and, optionally, other parameters associated with the PSD. This feature could be initiated, for example, when a user presses a button on the input device 16. If the input device 16 comprises a plurality of switches, an individual switch may be dedicated for each display parameter. When other input devices are used, appropriate modifications that will be apparent to those skilled in the art must be made. The base controller 12 receives the input from the input device 16, and communicates with the PSD 22 via the ports 14 and 15. After the PSD receives this communication via the ports 23 and 24, the PSD will report the contents of the appropriate register 26 to the base controller 12 via the ports 14, 15, 23, and 24. The base controller 12 then sends commands to the base display 13 which displays the desired information.

While the PSD based system of FIG. 1 satisfies the Postal Service's specifications, it does not include a display on the PSD itself, and does not provide a solution to the problems described above.

One way to add a display to a PSD based system is by moving the circuitry that provides the display functions from the base unit into the PSD unit. An alternative way is to duplicate those portions of the base unit circuitry that control the display, resulting in a dual display system with one display on the base unit, and a second display on the PSD itself.

These approaches, however, require connection to the registers in the PSD itself to provide the information for the display, which poses problems: First, additional connections increase the difficulty of meeting the rigorous cryptographic security requirements. Additionally, before the registers of a disconnected PSD could be accessed, internal power would have to be supplied, thereby decreasing the life of the battery that powers the tamper detection and erasure circuits.

Figure 2:
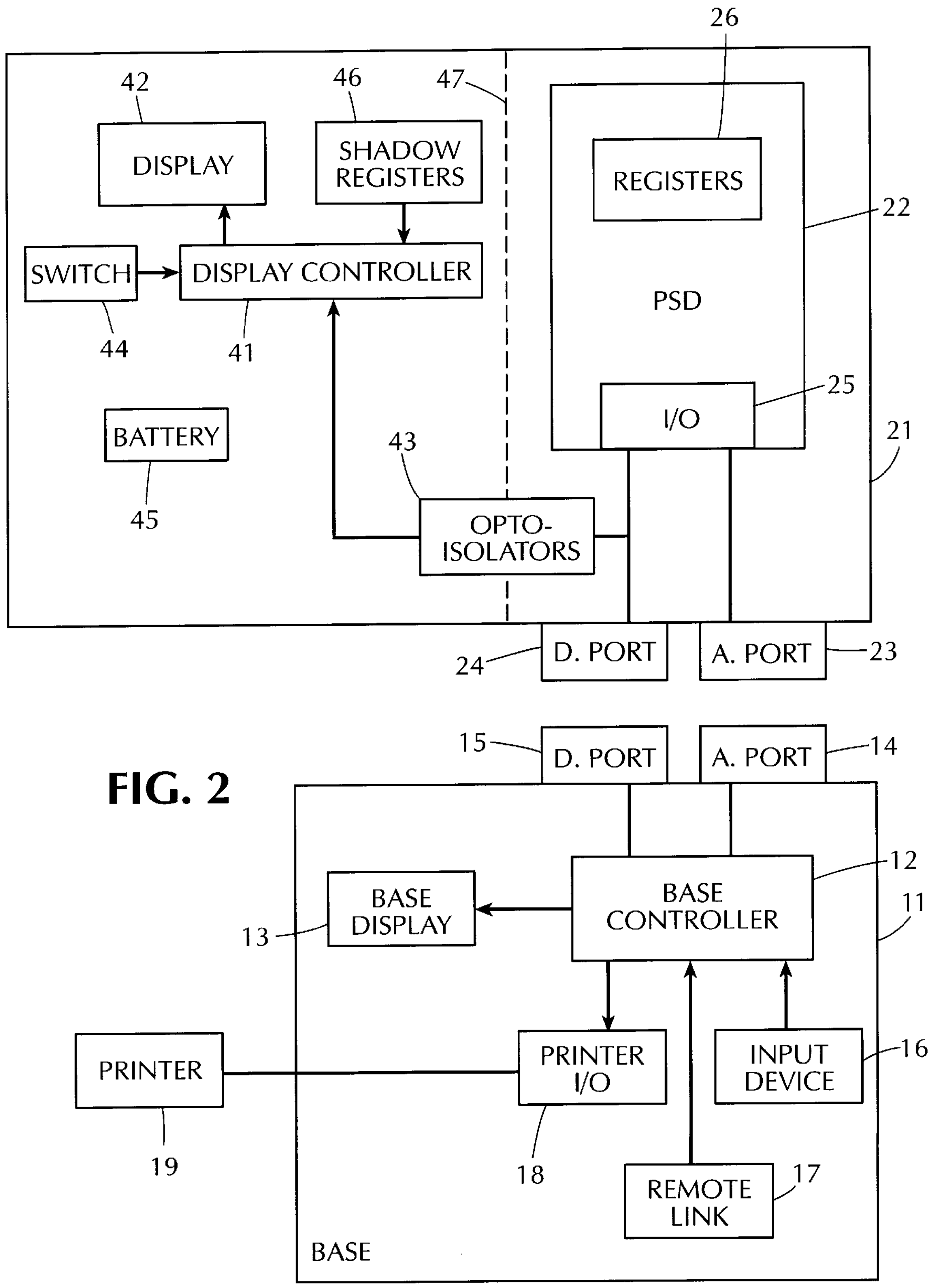
FIG. 2 is a block diagram of a PSD with a display in accordance with the present invention.

FIG. 2 is a block diagram of a PSD based postage meter system in accordance with the present invention that provides a solution to these shortcomings. The elements of FIG. 2 that have reference numbers less than 40 operate in the same way as the corresponding elements in FIG. 1, described above. By adding the display controller 41 and display 42, the PSD according to FIG. 2 provides for the direct display of the PSD registers, without installing the PSD into a base controller. Moreover, it also provides for the display of information contained in the PSD without connecting to the registers in the PSD.

In this embodiment, a display controller 41 and a display 42 are provided within the PSD housing 21, but external to the PSD's "cryptographic boundary" which contains the cryptographically sensitive components and circuits. The display controller 41 has access to a set of shadow registers 46. While these shadow registers are depicted outside of the display controller 41, they could alternatively be provided inside the display controller 41. The display controller 41 monitors the communications between the base controller 12 in the base unit 11 and the PSD 22 in the PSD housing 21 when the PSD 22 is connected to the base unit 11. Based on those communications, the display controller determines the values of the registers 26 in the PSD 22, and stores those values in the shadow registers 46 so that the shadow registers match the registers 26 in the PSD 22.

The shadow registers 46 can store the parameters in the same format as the registers 26 in the PSD 22. Alternatively, the data may be stored in the shadow registers in any other format, as long as the value of the parameter can be recreated from the stored data.

Optionally, optoisolators 43 may be used to monitor the activity on the communications lines between the PSD 22 and the base controller 12. This can be accomplished by connecting those lines to the inputs of a set of optoisolators, and providing the optoisolator outputs to the display controller 41. The outputs of these optoisolators will track their inputs, providing a copy of all PSD/base controller communications to the display controller 41.

When the PSD is connected to a host and is active, the circuitry to the right of dashed line 47 is preferably powered from the host, and the PSD display circuitry to the left of dashed line 47 may be powered from the host or from its own power source 45. A user-replaceable primary battery (including, but not limited to, lithium and alkaline batteries) or a rechargeable battery (including, but not limited to, NiCd and NiMH batteries) may be used as the power source 45. Another energy storage element (e.g., a capacitor) could also be used as the power source 45. Alternatively, a solar cell may be used to power the circuitry to the left of the dashed line. When a rechargeable battery or a capacitor is used, they can be charged from power from the base 11 while the PSD housing 21 is installed on the base. Because the circuitry on the right is not powered by the power source 45, using optoisolators extends the operating time of the power source 45, which is needed for the PSD display when the PSD is not connected to a host.

Alternatively, the optoisolators 43 can be omitted, and the lines that carry the communications between the PSD 22 and the base controller 12 can be tapped into directly and provided to the display controller 41. Optionally, a diode may be used to pass current from the right side to the left side to charge the battery, but block current in the other direction. This allows the battery 45 to power the display circuitry without powering the PSD 22 itself. As yet another alternative, a different isolation scheme (e.g., transformer coupling) may be used.

The interpretation, by the display controller 41, of the communications between the PSD 22 and the base controller 12 will depend on the format established for those communications.

One preferred approach would be to have the PSD report updated values of registers 26 each time those registers change. With this approach, the display controller need only monitor the communications from the PSD to the host and update the shadow registers 46 in step with those communications. Alternatively, the PSD may be programmed to automatically communicate the contents of the registers 26 periodically (e.g., two times per second).

Another preferred approach would be to design the PSD so that it appends a prefix code each time it reports the values of the PSD registers to the host. With this approach, the display controller can monitor the communications from the PSD to the host and listen for the prefix code. When the prefix code is received, the display controller will extract the values of the PSD registers from the data that follows the prefix code. With this approach, as well as the previous one, the display controller need not monitor the communications going from the host to the PSD.

In another embodiment, the software in the PSD 22 may be implemented to provide services in response to a request by the host, with the PSD 22 remaining idle until it receives a request from the base controller 12 to do something. These requests could include, for example, a finance operation (to download postage into the PSD) and an indicium creation function.

The display controller 41 monitors the communications in both directions between the PSD 22 and the host. When the display controller 41 recognizes that a request has been sent from the base controller 12 to the PSD 22, the display controller 41 waits for the PSD to respond to this request. The display controller 41 then extracts the register values from the data that the PSD 22 sends to the base controller 12 in response to the request. The display controller 41 then updates the shadow registers 46 based on that data.

In yet another embodiment, the display controller 41 computes the values of the shadow registers based on communications from the base controller 12 to the PSD 22. The display controller listens for the commands sent from the base controller 12 to the PSD 22. The display controller 41 then extracts, from these commands, the data that effects the registers 26 (such as the "added postage value field" in the download operation, and a "postage value to be printed" field in the indicium creation operation). The display controller 41 then updates the shadow registers 46 in accordance with that data. For example, when postage is downloaded, the shadow register 46 tracking the descending register 26 will be incremented by the amount that is being downloaded. When indicia are printed, the shadow register 46 tracking the descending register 26 will be decremented and the shadow register 46 tracking the ascending register 26 will be incremented.

Optionally, the display controller 41 can wait for a status message generated by either the PSD 22 or the base controller 12, indicating that the transaction was completed successfully, before updating the shadow registers 46. This step would improve the reliability of the displayed data.

Because the shadow registers 46 provide a duplicate copy of the PSD registers 26, the shadow registers can be used to determine the values of the registers within the PSD without accessing those registers. These values can then be displayed on display 42. Many types of displays are suitable for this purpose, including, for example, numeric, alphanumeric, and bar graph displays based on, for example, liquid crystal, LED, and vacuum fluorescent technology. This arrangement enables the contents of registers in the PSD 22 to be displayed without turning on the PSD 22, and without plugging the PSD 22 into the base unit 11.

If designed appropriately, the display 42 may remain on continuously. In this case, it is preferably to use a low power display (e.g., a liquid crystal display) to reduce the drain on the internal power source 45.

In an alternative embodiment, a switch 44 is used to activate the display of the shadow register data on the display 42. The display controller 41 senses the actuation of the switch 44 in any conventional manner, and initiates a display routine to provide a display for a predetermined period of time, such as 10 seconds. Turning the display off in this manner extends the life of the battery 45.

The values of more than one PSD register value may also be displayed, either simultaneously (by adding additional displays), or sequentially. To accomplish this, the display controller 41 maintains a shadow register 46 for each PSD register 26 that is to be displayed. This is done by monitoring the communications between the PSD 22 and the base unit 11, as described above. Then, when a user wishes to determine the value of any of the registers 26 in the PSD 22, the display controller 41 can read the contents of the corresponding shadow register 46 and display that value on the display 42.

When the register values are displayed sequentially, various approaches can be used to select the desired register for display. In one approach, a plurality of individual pushbutton switches are provided, one for each register. When a given switch is pressed, the display controller recognizes this condition in any conventional manner and displays the appropriate register contents. In another approach, a single pushbutton switch can be used, and each time the switch is depressed, a different register can be displayed. Optionally, an indication may be displayed to indicate which parameter is currently being displayed. A character or group of characters on the display may be reserved for this purpose. The system may be optionally configured to shut the display off automatically after a predetermined amount of time has passed.

The base unit 11 also includes a remote link 17 that allows the base unit to communicate with remote parties (e.g., the Postal Service) for downloading postage into the meter and for performing audits.

Figure 3:
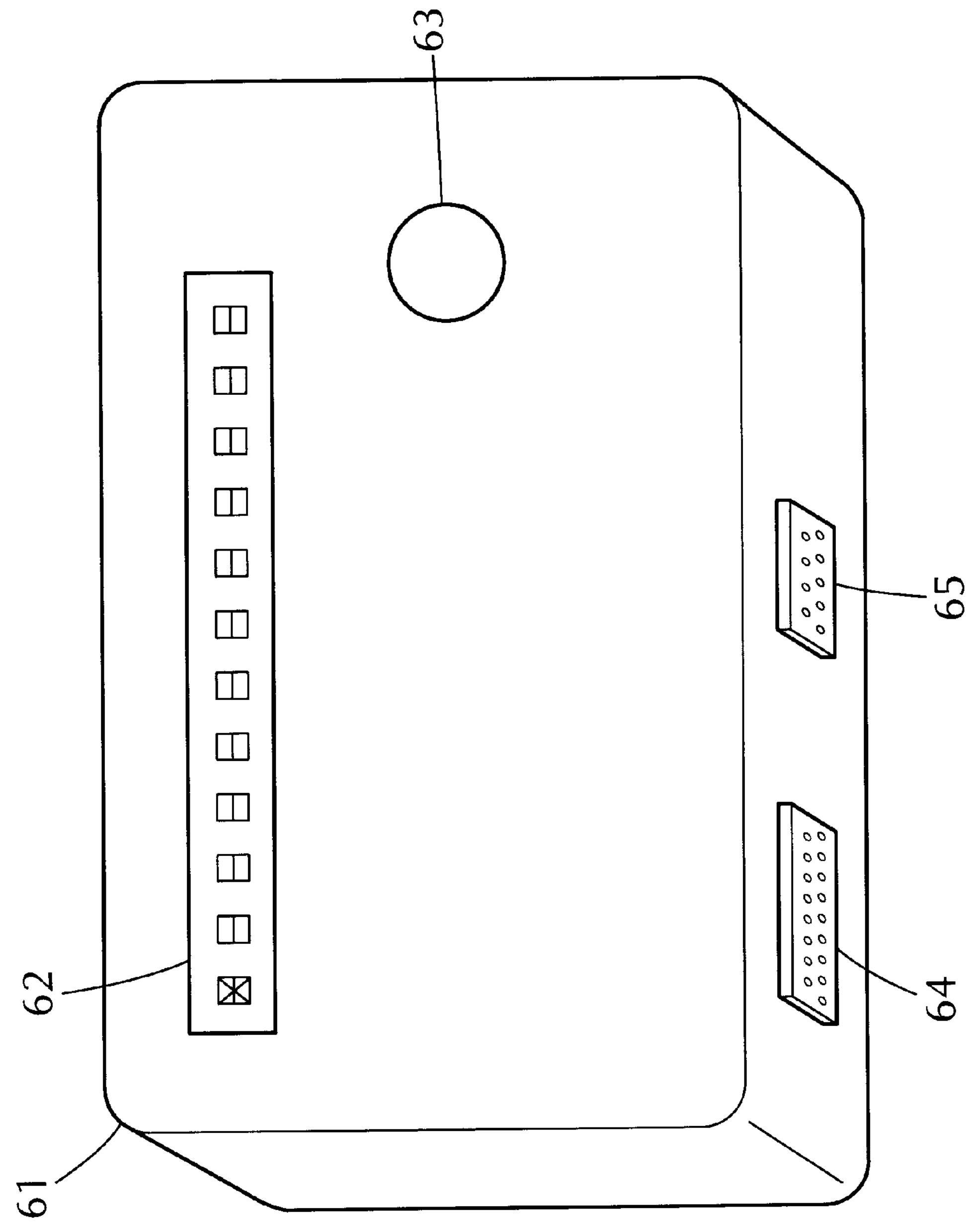
FIG. 3 is a sketch of a PSD cartridge in accordance with the resent invention.

FIG. 3 is a sketch of an external view of the PSD in accordance with the present invention. Housing 61 includes the PSD circuitry and the display circuitry. The display device 62 is mounted in the housing 61 so that it is visible from the outside of the housing. Optionally, an alphanumeric character may be used to indicate which parameter is being displayed (e.g., by displaying A for ascending and D for descending at the left-most character of the display 62). Switch 63 is a push-button switch used to sequence through the various displayable parameters, as described above. Connectors 64 and 65 provide the physically distinct connections for the data port and the authentication port, as required by the PSD specification.

The term "register", as used herein, includes traditional registers, such as those constructed using D type flip flops. It also includes other storage devices including, but not limited to, other types of flip-flops, latches, random access memory (RAM), nonvolatile RAM (NVRAM), programmable read only memory (PROM), electrically erasable PROM (EEPROM), and optical memory devices.

While the present invention has been described above in the context of a PSD, the present invention can also be used in different applications, by adding a display circuit to a primary circuit other than a PSD.

In addition, while the present invention has been described above with reference to the specific embodiments, it is to be understood that the invention is not limited to those precise embodiments, and that various changes and modifications can be effected therein without departing from the scope or spirit of the present invention.

What is claimed is:

1. An apparatus comprising:

(a) a Postal Security Device (PSD) including a first register for storing first data representing a first parameter, wherein said PSD communicates with an external device, and modifies the contents of the first register based on a communication received from the external device; and (b) a display circuit including a second register for storing second data representing the first parameter, and a display for displaying the first parameter based on the second data stored in the second register, wherein said display circuit receives a communication between said PSD and the external device and modifies the contents of the second register based on the communication between said PSD and the external device.

2. The apparatus as defined in claim 1, wherein the second register comprises at least one of a RAM, NVRAM, PROM, EEPROM, optical memory, flip-flop, and latch.

3. The apparatus as defined in claim 1, wherein the communication between said PSD and the external device comprises a communication from said PSD to the external device.

4. The apparatus as defined in claim 3, wherein said PSD is programmed to transmit data representing the first parameter to the external device each time the first parameter is updated.

5. The apparatus as defined in claim 3, wherein said PSD is programmed to transmit data representing the first parameter to the external device at periodic intervals.

6. The apparatus as defined in claim 1, wherein the communication between said PSD and the external device comprises a communication from the external device to said PSD.

7. The apparatus as defined in claim 1, wherein the first register is a descending register.

8. The apparatus as defined in claim 1, wherein said display circuit further comprises an input device for activating the display.

9. The apparatus as defined in claim 1, wherein said PSD further includes a third register for storing third data representing a second parameter, said PSD modifies the contents of the third register based on the communication received from the external device, said display circuit further includes a fourth register for storing fourth data representing the second parameter, said display circuit displays the second parameter based on the fourth data stored in the fourth register, and said display circuit modifies the contents of the fourth register based on the communication between said PSD and the external device.

10. The apparatus as defined in claim 9, wherein said display circuit further comprises an input device for selecting whether the first parameter or the second parameter is to be displayed.

11. An apparatus comprising:

(a) a postal security device (PSD) including a first register for storing first data representing a first parameter, wherein said PSD communicates with an external device, and modifies the contents of the first register based on a communication received from the external device;

(b) a display circuit including a second register for storing second data representing the first parameter, and a display for displaying the first parameter based on the second data stored in the second register, wherein said display circuit receives a communication between said PSD and the external device and modifies the contents of the second register based on the communication between said PSD and the external device; and (c) a first port for passing the communication between said PSD and the external device.

12. The apparatus as defined in claim 11, wherein the communication between said PSD and the external device comprises a communication from said PSD to the external device.

13. The apparatus as defined in claim 12, wherein said PSD is programmed to transmit data representing the first parameter to the external device each time the first parameter is updated.

14. The apparatus as defined in claim 12, wherein said PSD is programmed to transmit data representing the first parameter to the external device at periodic intervals.

15. The apparatus as defined in claim 11, wherein the communication between said PSD and the external device comprises a communication from the external device to said PSD.

16. The apparatus as defined in claim 11, further comprising a second port for passing communications between said PSD and the external device.

17. The apparatus as defined in claim 11, wherein the second register comprises at least one of a RAM, NVRAM, PROM, EEPROM, optical memory, flip-flop, and latch.

18. The apparatus as defined in claim 11, wherein the first register is a descending register.

19. The apparatus as defined in claim 11, wherein said display circuit further comprises an input device for activating the display.

20. The apparatus as defined in claim 11, wherein said PSD further includes a third register for storing third data representing a second parameter, said PSD modifies the contents of the third register based on the communication received from the external device, said display circuit further includes a fourth register for storing fourth data representing the second parameter, said display circuit displays the second parameter based on the fourth data stored in the fourth register, and said display circuit modifies the contents of the fourth register based on the communication between said PSD and the external device.

21. The apparatus as defined in claim 20, wherein said display circuit further comprises an input device for selecting whether the first parameter or the second parameter is to be displayed.

22. The apparatus as defined in claim 11, wherein, when a power source is connected to said display circuit, the power source provides power to said display circuit but does not provide power to said PSD.

23. The apparatus as defined in claim 11, further comprising an optoisolator having an input section for receiving the communication between said PSD and the external device, and an output section connected to said display circuit, wherein the power source provides power to the output section but does not provide power to the input section.

24. A method of determining a value of a parameter stored in a first register in a Postal Security Device (PSD), the PSD receiving a communication form an external device and modifying the contents of the first register based on the communication received from the external source, the method comprising the steps of;

storing second data representing the first parameter in a second register;

displaying the first parameter based on the second data stored in the second register;

receiving a communication between the PSD and the external device; and modifying the contents of the second register based on the communication between the PSD and the external device.

25. The method according to claim 24, wherein the first register comprises a descending register.

* * * * *